United States Patent [19]

Schlegel et al.

[11] Patent Number: 4,577,844

[45] Date of Patent: Mar. 25, 1986

[54] VERTICALLY ADJUSTABLE DEVICE

[75] Inventors: Wolfgang Schlegel, Oehringen; Arthur Wilke, Bad Friedrichshall-Jagstfeld; Roland Stein, Oehringen-Verrenberg, all of Fed. Rep. of Germany

[73] Assignee: Schlegel GmbH, Oehringen, Fed. Rep. of Germany

[21] Appl. No.: 700,398

[22] Filed: Feb. 11, 1985

Related U.S. Application Data

[63] Continuation of Ser. No. 540,326, Oct. 11, 1983, abandoned.

[30] Foreign Application Priority Data

Nov. 19, 1982 [DE] Fed. Rep. of Germany ....... 3242832

[51] Int. Cl.[4] .............................................. B23Q 1/04

[52] U.S. Cl. ....................................... 269/71; 269/78; 269/310

[58] Field of Search ....................... 269/63, 71, 78, 95, 269/310; 403/110, 309, 310; 254/98, 103; 248/631

[56] References Cited

U.S. PATENT DOCUMENTS 3,881,687 5/1975 Johansson ................................ 254/1

4,387,886 6/1983 Schlegel et al. ...................... 269/71

*Primary Examiner*—Frederick R. Schmidt

*Assistant Examiner*—Judy J. Hartman

*Attorney, Agent, or Firm*—Daniel H. Kane, Jr.

[57] ABSTRACT

A vertically adjustable carrier for a vise comprises a vertical support tube and a mounting which can be secured to a work bench and which comprises two semicylindrical shells which embrace the support tube and which can be clamped together to fix the support tube in any desired vertical position. The shells extend downwardly from the mounting and define a cavity which accommodates a gas spring which abuts on one end on the support tube and on the other end on the bottom of the composed half shells and exerts an upwardly directed force on the support tube to ease its vertical movement.

17 Claims, 5 Drawing Figures

VERTICALLY ADJUSTABLE DEVICE

This is a continuation of application Ser. No. 540,326, filed Oct. 11, 1983 now abandoned.

FIELD OF THE INVENTION

This invention relates to a novel, vertically adjustable device for vises, assembly platforms and the like, comprising a vertical support tube, a mounting for attachment to a work bench or the like, said mounting comprising two semicylidrical clamping shells which embrace the support tube and which can be clamped together, one of the shells being stationary and the other being movable, and further comprising a spring means which abuts on one end on the mounting and on the other end on the support tube and which exerts an upwardly directed force upon the support tube.

BACKGROUND OF THE INVENTION

U.S. Pat. No. 4,387,886 discloses a vertically adjustable device of the kind set forth in which the support tube is arranged within a longitudinally slit guide tube which is embraced by the semicylindrical shells and which is reduced in diameter when the shells are clamped together so that the support tube can be fixed in any vertical position. The closed lower end or bottom of the guide tube forms the abutment for the lower end of the spring means. In order to obtain an easy vertical adjustment or movement of the support tube when the clamping means formed by the shells is loosened, and to exert a great clamping force without excessive manual force it is necessary that relatively close tolerances must be observed between the inner diameter of the semicylindrical shells and the outer diameter of the guide tube and between the inner diameter of the guide tube and the outer diameter of the support tube. The necessity to maintain relatively close tolerances between three cooperating parts renders the manufacture of this device comparatively expensive.

OBJECT OF THE INVENTION

Therefore it is the primary object of the invention to provide a vertically adjustable device of the kind set forth which is of simpler design, allows for relatively large tolerances and can therefore be produced with lower costs.

SUMMARY OF THE INVENTION

The above and other beneficial objects and advantages are attained in accordance with the present invention in that the two semicylindrical shells extend downwardly from the mounting and define a cavity for accommodating the spring means and are provided with means for abutting the lower end of the spring means.

It is apparent that with the proposed device the guide tube is dispensed with and its task or purpose is taken over by the extended semicylindrical shells which form a tube in which the support tube is guided. By omission of the guide tube not only one part is saved but also only the tolerances between the outer diameter of the support tube and the inner diameter of the shells must be observed. If the shells are manufactured from light alloy by die-casting normally no machining of their inner surfaces is necessary.

The two semicylindrical shells can define a cavity closed at its lower end. Each shell can be provided at its lower end with an axially-extending projection, and the lower end of the composed shells can be held together by a part which embraces the projections. This part can be a spring ring which is inserted in an appropriate circumferential groove in the outer surface of the projections.

The inner surfaces of the shells can be provided with protrusions, preferably in form of circumferential ribs. These protrusions can serve as abutment for the lower end of the spring means or as limit stop for the downward movement of the support tube, for instance to prevent a clamping of the hand of the user between the mounting and an appliance mounted on the device. Several axially-spaced protrusions or ribs can be provided so that spring means of different length and limit stops for the support tube at different levels can be provided. The abutment or the limit stop can be formed by a disk inserted into the tube formed by the two semicylindrical shells and supported upon the appropriate protrusions or ribs. Said disk can be provided with a central opening through which the spring means extends if the lower end of the spring means is to abut on the bottom of the shells.

In lieu of the protrusions a tubular body of suitable length can be inserted in the cavity defined by the shells, the lower end of said body abutting on the bottom of the shells and the upper end serving as limit stop for the support tube and/or as abutment for the lower end of the spring means.

Preferably the spring means is a gas spring as disclosed in said U.S. Pat. No. 4,387,886.

BRIEF DESCRIPTION OF THE DRAWINGS

A preferred embodiment of the invention is shown in the accompanying drawings in which.

Figure 2:
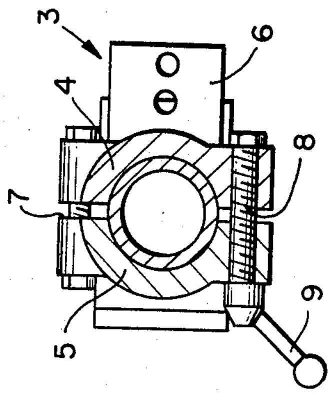
FIG. 2 is a sectional viwe taken along lines 2—2 in FIG. 1.

The vertically adjustable device comprises a vertical support tube 1 which carries as its upper end a plate 2 on which a vise, an assembly platform or the like can be mounted. A mounting means 3 which can be attached to a work bench or the like comprises two semicylindrical shells 4 and 5 which embrace the support tube 1. Shell 4 is stationary and comprises an extension 6 by which the mounting means 3 can be secured to the work bench. The word "mounting" and phrase "mounting means" are used here and in the claims to refer to the semicylindrical shells 4,5 which are constructed as two separate pieces or parts, and the supporting extension 6 connected to the stationary shell 4 by which the mounting or mounting means can be secured to a work bench. The combination comprising the "mounting" or "mounting means" is designated generally by reference numeral 3 as shown in FIG. 2 where reference numeral 3 is accompanied by an arrow directed toward the combination of elements 4, 5, and 6 comprising the mounting or mounting means identified as above. Shell 5 is movable with respect to the stationary shell 4. The two shells are interconnected on one side by two support means in form of screws 7 and on the other side by a clamping screw 8 with handle 9. By tightening of the clamping screw 8 the two shells are clamped together and clamp the support tube 1 in place in any desired position.

The two half shells 4 and 5 extend from the mounting means 3 downwardly and define a cavity 10 which accommodates a gas spring 11. Gas spring 11 comprises a cylinder 12, piston 13 and a piston rod 14 extending therefrom. The cylinder cavity 15 contains gas under relatively high pressure. The upper end of gas spring 11 i.e. the end of piston rod 14 abuts on the lower surface of plate 2 connected to the support tube 1. The lower end of gas spring 11 i.e. the lower end of cylinder 12 abuts on a disk 16 which is positively inserted in the tube formed by the combined half shells 4 and 5. To this end the inner walls of the half shells 4 and 5 are provided with circumferential ribs 17 and 18, resp., which support the disk 16. In the embodiment shown there are provided three axially-spaced ribs in order to accommodate gas springs of different length. The gas spring 11 can also abut on the lower end or bottom 19 of the half shells 4 and 5. The disk 16 serves also as a limiting stop for the downward movement of the support tube 1 in order to prevent a squeezing of a hand of the user between the plate 2 and the extension 6 or the work bench. The disk 16 can be provided with a central opening through which the gas spring may extend if the disk 16 shall serve only as a limit stop for the support tube 1 and the gas spring 11 shall abut on the bottom 19.

The two half shells 4 and 5 are provided at their lower ends each with an axially extending projection 20 and 21, resp. with a circumferential groove 22 which accommodates a spring ring 23 which holds the lower ends of the half shells 4 and 5 together.

In lieu of the circumferential ribs 17, 18 there can naturally be provided individual projections in one or several planes.

Figure 3:
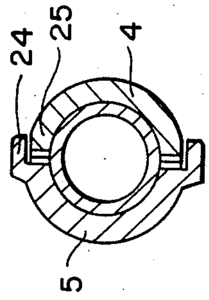
FIG. 3 is a sectional view taken along lines 3—3 in FIG. 1.
Figure 1:
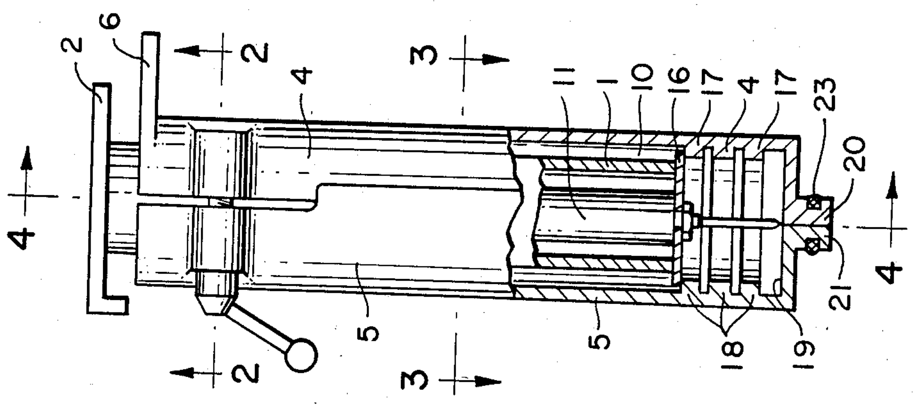
FIG. 1 is a side elevation of a vertically adjustable device according to the invention.
Figure 4:
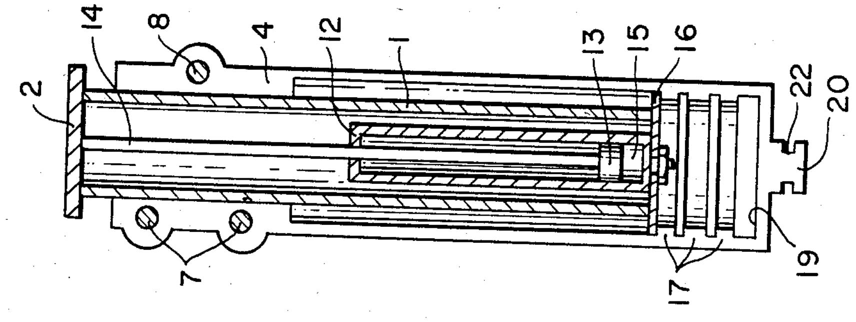
FIG. 4 is a sectional view taken along lines 4—4 in FIG. 1.

As can be seen from FIG. 3 the edges 24,25 of the two half shells 4,5, overlap outside of the clamping zone. This serves the purpose to seal the cavity 10 so that contamination is decreased.

Figure 5:
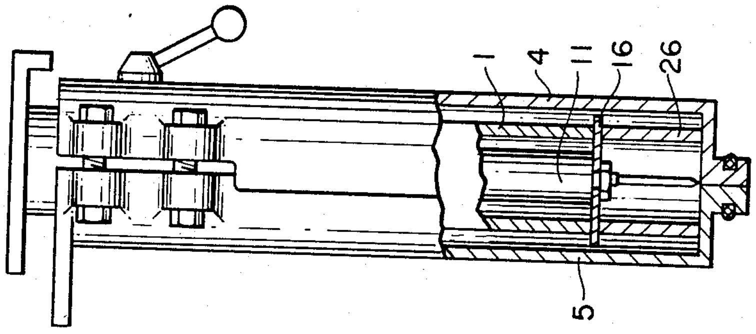
FIG. 5 is a sectional view similar to FIG. 4 with a modified abutment for the spring means.

FIG. 5 shows a modification of the embodiment of FIGS. 1 to 4. Instead of the circumferential ribs 17,18 there is inserted in the cavity 10 a tubular body 26 which abuts on the bottom 19 of the cavity 10 and the upper end of which serves by way of disk 16 as abutment for the lower end of gas spring 11 and as limiting stop for the support tube 1.

It is clear to a man skilled in the art that various modifications to the invention presented herein can be made without departing from its scope as defined in the appended claims. So a coil spring or another spring element can be used in lieu of gas spring 11. The half shells 4,5 need not define a closed cavity although this is preferred for the sake of safety and reduction of contamination.

What we claim is:

1. A vertically adjustable device for vises and assembly platforms, comprising a vertical support tube for supporting said vise, a mounting for attaching said support tube to a work bench, said mounting comprising two semicylindrical clamping shells directly embracing said support tube without an intermediate guide tube, one of said shells being stationary and having connected to it a supporting extension for attachment to said work bench, the other shell being movable with respect to the stationary shell, means for clamping said clamping shells together directly against the support tube to fix said support tube in any desired vertical position, said shells extending from said supporting extension beyond a lower end of the support tube and defining a cavity, and spring means positioned within said cavity and extending into said support tube, said spring means having one end in abutting relation with said support tube and the other end in abutting relation with said shells beyond the end of said support tube.

2. The device of claim 1 wherein the two semicylindrical clamping shells define a cavity closed beyond the end of the support tube, each shell having at its closed end an axially extending projection, and further comprising a member which embraces the lower ends of the shells.

3. The device of claim 2 wherein the member is a spring ring and wherein a circumferential groove is formed in outer surfaces of said axially extending projections for receiving the spring ring.

4. The device of claim 1 wherein inner surfaces of the shells are provided with projections which serve as abutment means for abutting relation of the other end of the spring means with said shells.

5. The device of claim 4 wherein the projections are formed by circumferential ribs.

6. The device of claim 4 wherein the inner surfaces of the shells are formed with a plurality of axially spaced projections.

7. The device of claim 5 wherein the inner surfaces of the shells are formed with a plurality of axially spaced ribs.

8. The device of claim 4 further comprising a disk supported on said projections, said disk forming an abutment for said other end of the spring means and a limiting stop for downward movement of the support tube.

9. The device of claim 2 further comprising a tubular member inserted in the cavity and supported by the bottom of said shells, an upper end of said tubular member forming an abutment for said other end of said spring means and a limiting stop for downward movement of the support tube.

10. The device of claim 1 wherein said spring means is formed by a gas spring.

11. The device of claim 1 wherein the means for clamping said two clamping shells together comprises interconnecting means interconnecting the two clamping shells on one side and clamping screw means interconnecting the two clamping shells on the other side.

12. The device of claim 11 wherein said clamping screw means comprises handle means for operatively compressing and constraining the two clamping shells against the support tube.

13. The device of claim 11 wherein said interconnecting means comprises screw means on one side of the clamping shells.

14. A vertically adjustable device for vises and assembly platforms, comprising a vertical support tube for supporting said vise, a mounting for attaching said support tube to a work bench, said mounting comprising two semicylindrical clamping shells directly embracing said support tube without an intermediate guide tube, one of said shells being stationary and having connected to it a supporting extension for attachment to said work bench, the other shell being movable with respect to the stationary shell, said clamping shells being constructed and arranged as two separate pieces comprising interconnecting means for interconnecting the two clamping shells on one side and clamping means compressibly coupling the two clamping shells on the other side, said clamping means comprising handle means for operatively compressing and constraining the two clamping shells directly against the support tube to fix said support tube in any desired vertical position, said shells extending from said supporting extension beyond a lower end of the support tube and defining a cavity, and spring means positioned within said cavity and extending into said support tube, said spring means having one end in abutting relation with said support tube and the other end in abutting relation with said shells beyond the lower end of said support tube.

15. The device of claim 14 wherein the interconnecting means comprises screw means passing through the two clamping shells on one side.

16. The device of claim 14 wherein the clamping means comprises clamping screw means passing through the two clamping shells on the other side.

17. A vertically adjustable device for vises and assembly platforms, comprising a vertical support tube for supporting said vise, a mounting for attaching said support tube to a work bench, said mounting comprising two semicylindrical clamping shells embracing said support tube, one of said shells being stationary and having connected to it a supporting extension for attachment to said work bench, the other shell being movable with respect to the stationary shell, means for clamping said clamping shells together directly against the support tube to fix said support tube in any desired vertical position, said shells extending downwardly from said supporting extension beyond a lower end of the support tube lower and defining a cavity closed beyond the end of the support tube, each shell having at its end beyond the support tube an axially extending projection, a spring ring member which embraces the closed ends of the shells, said shells being formed with a circumferential groove in the outer surfaces of the axially extending projections for receiving the spring ring, and spring means positioned within said cavity and extending into said support tube, said spring means having one end in abutting relation with said support tube and the other end in abutting relation with said shells beyond the end of said support tube.

* * * * *